United States Patent
Robison et al.

(10) Patent No.: US 11,258,781 B2
(45) Date of Patent: *Feb. 22, 2022

(54) CONTEXT AND DEVICE STATE DRIVEN AUTHORIZATION FOR DEVICES

(71) Applicant: Dell Products L. P., Round Rock, TX (US)

(72) Inventors: Charles D. Robison, Buford, GA (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/804,436

(22) Filed: Feb. 28, 2020

(65) Prior Publication Data

US 2020/0204539 A1 Jun. 25, 2020

Related U.S. Application Data

(63) Continuation of application No. 15/782,190, filed on Oct. 12, 2017, now Pat. No. 10,616,207.

(51) Int. Cl.
*H04L 29/06* (2006.01)
*H04W 12/06* (2021.01)
(Continued)

(52) U.S. Cl.
CPC ........ *H04L 63/0823* (2013.01); *H04L 63/105* (2013.01); *H04L 63/1408* (2013.01); *H04L 63/1475* (2013.01); *H04W 4/70* (2018.02); *H04W 4/80* (2018.02); *H04W 12/06* (2013.01); *H04W 12/08* (2013.01); *H04W 12/122* (2021.01); *H04W 12/63* (2021.01)

(58) Field of Classification Search
CPC .............. H04L 63/0823; H04L 63/105; H04L 63/1408; H04L 63/1475; H04W 12/06; H04W 12/08; H04W 12/122; H04W 12/63; H04W 4/70; H04W 4/80
See application file for complete search history.

(56) References Cited

U.S. PATENT DOCUMENTS

| 9,032,501 B1 * | 5/2015 | Martin | H04L 63/061 726/10 |
| 9,038,158 B1 * | 5/2015 | MacKay | H04W 4/80 726/10 |

(Continued)

*Primary Examiner* — Michael Simitoski
(74) *Attorney, Agent, or Firm* — Larson Newman, LLP

(57) ABSTRACT

In some examples, a target device determines that each device of a plurality of devices (i) includes a certificate that is provided to each device during provisioning, (ii) is within a predetermined distance from the target device, (iii) includes a beacon secret that is broadcast to each device at a predetermined time interval, and (iv) that either: (a) a privilege level associated with at least one device of the plurality of devices satisfies a particular privilege level specified by an access policy or (b) a number of the plurality devices with the determined distance from the target device satisfies a predetermined number specified by the access policy. The target device grants at least one device of the plurality of devices access to the target device, and receives a message from the at least one device. The target device initiates an action based at least in part on the message.

20 Claims, 8 Drawing Sheets

(51) Int. Cl.
*H04W 4/80* (2018.01)
*H04W 4/70* (2018.01)
*H04W 12/08* (2021.01)
*H04W 12/63* (2021.01)
*H04W 12/122* (2021.01)

(56) References Cited

U.S. PATENT DOCUMENTS

| | | | |
|---|---|---|---|
| 10,153,908 B2* | 12/2018 | Kravitz | H04L 9/0819 |
| 2007/0173273 A1* | 7/2007 | Gogic | H04B 7/026 |
| | | | 455/518 |
| 2010/0064350 A1* | 3/2010 | Dondeti | H04L 63/102 |
| | | | 726/4 |
| 2012/0008526 A1* | 1/2012 | Borghei | H04W 4/022 |
| | | | 370/254 |
| 2012/0324218 A1* | 12/2012 | Duren | H04L 9/0825 |
| | | | 713/158 |
| 2012/0331527 A1* | 12/2012 | Walters | G06F 21/6218 |
| | | | 726/4 |
| 2014/0074991 A1* | 3/2014 | Gibson | H04L 67/1021 |
| | | | 709/219 |
| 2014/0282877 A1* | 9/2014 | Mahaffey | H04W 12/08 |
| | | | 726/3 |
| 2014/0331287 A1* | 11/2014 | Barr | H04L 63/08 |
| | | | 726/4 |
| 2015/0061829 A1* | 3/2015 | Williams | G07C 9/28 |
| | | | 340/5.61 |
| 2016/0044032 A1* | 2/2016 | Kim | H04W 76/15 |
| | | | 726/5 |
| 2016/0337863 A1* | 11/2016 | Robinson | H04W 4/021 |
| 2017/0094706 A1* | 3/2017 | Kim | H04L 67/141 |
| 2017/0289185 A1* | 10/2017 | Mandyam | H04L 63/0245 |
| 2018/0006829 A1* | 1/2018 | Kravitz | H04W 12/06 |
| 2018/0359566 A1* | 12/2018 | Chang | H04R 1/26 |
| 2018/0364972 A1* | 12/2018 | Sim | G06F 3/165 |
| 2019/0089696 A1* | 3/2019 | Kim | H04L 63/0876 |

* cited by examiner

CONTEXT AND DEVICE STATE DRIVEN AUTHORIZATION FOR DEVICES

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

More and more devices, such as appliances (e.g., refrigerator, thermostat, and the like), can connect to a network, such as a wireless network (e.g., WiFi®, Bluetooth®, or other similar technology), resulting in the Internet of Things (IoT). IoT refers to an environment in which devices that traditionally did not access a network may be capable of accessing and communicating (e.g., sending and receiving) information to other devices. Thus, an environment, such as a workplace or a home, may have multiple devices, from multiple manufacturers, that are capable of connecting to a network.

However, the IoT may result in security problems. For example, a hacker may acquire a device that was being used in a network environment (e.g., a home network or a work network) and use the device to access the network. Alternately, the hacker may bring a new device into the network environment and use the new device to gain access to the network. Once the hacker has access to the network, the hacker can access other network accessible devices.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a target device may store a policy that includes one or more conditions. For example, a condition of the policy may specify that each device of the multiple devices have a certificate that was deployed to each device when each device was provisioned. A condition of the policy may specify that each device of the multiple devices be within a predetermined distance (or within a particular distance range) from the target device. A condition of the policy may specify that each device of the plurality of devices have a beacon secret. The beacon secret may be broadcast at a predetermined time interval. The beacon secret may be broadcast out-of-band to local devices (e.g., within a predetermined distance from the beacon). When the target device determines that the conditions of the policy are satisfied, the target device may grant the multiple devices access to the target device. After the plurality of devices are granted access to the target device, a particular device of the plurality of devices may send a message to the target device. In response, the target device may initiate an action. If the target device determines that the conditions of the policy are no longer being satisfied, then the target device may deny the multiple devices access to the target device or may reduce the level of access (e.g., reduced set of commands, commands performed more slowly, or the like) to the target device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
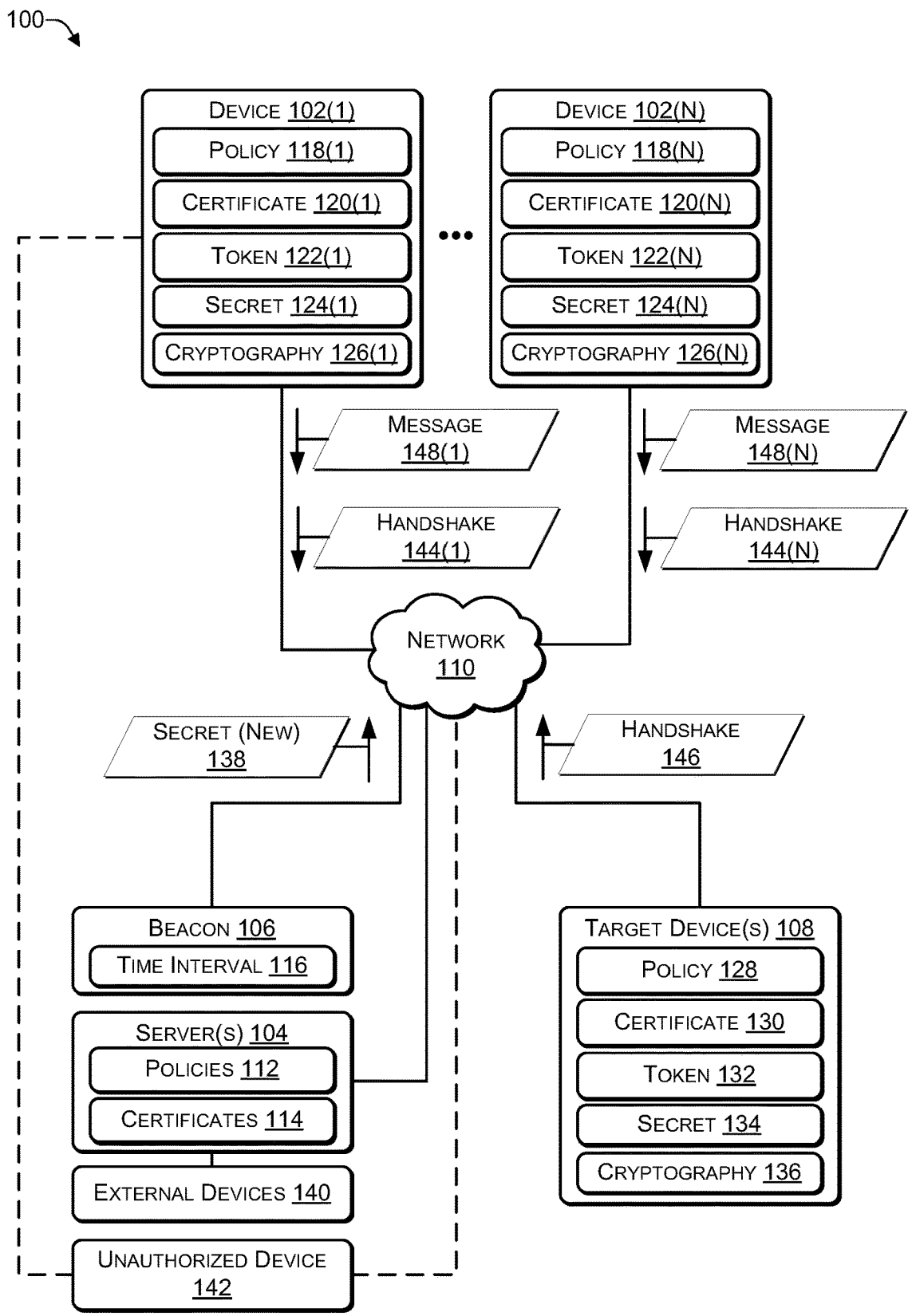
FIG. 1 is a block diagram illustrating an architecture that includes multiple devices according to some implementations.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Beacon: A beacon may be used to broadcast a secret, such as a NONCE or a cryptographic key, to devices within a predetermined proximity to the beacon. For example, the beacon may broadcast the secret out of band, e.g., using a different means (e.g., a different frequency band or other means) such that only devices within a particular range of the beacon receive the broadcast. For example, the beacon may broadcast the secret using a wireless networking technology, such as Wi-Fi or other radio frequency (RF) mechanism. To illustrate, in a network environment, multiple devices may access a network using a wired network technology (e.g., Ethernet) or using a specific Wi-Fi band or set of Wi-Fi bands. The beacon may broadcast the secret on a specific Wi-Fi band at a particular time (e.g., every hour on the hour). The multiple devices in the network environment may be programmed to listen to the specific Wi-Fi band at the particular time. The secret may change periodically (every minute, hourly, daily, monthly, etc.). The devices may receive the secret that is broadcast out of band by the beacon and use the secret to encrypt traffic on a network. Devices that have received the most recently broadcast secret from the beacon are capable of decrypting the encrypted traffic (e.g., encrypted using the secret) and can trust the communication. Thus, even if a hacker is able to remotely access one of the devices in the network environment, the hacker cannot access other devices because the hacker does not have the secret.

Certificate: A digital certificate (also known as a "certificate") is a type of electronic credential that may be used to identify a device (or a user of the device) on a network, the way a person (human being) may use a driver's license to assert the person's identity. A digital certificate may include a public key and an identity of an owner of the certificate. A digital certificate may be issued by one or more certification authorities (CAs) that validate the identity of the certificate-holder both before the certificate is issued and each time the certificate is used. Common uses include business scenarios requiring authentication, encryption, and digital signing. The primary uses of the certificate may include (i) encryption, (ii) signature, (iii) signature and encryption, or any combination thereof. When a certificate is used for encryption, the certificate may include cryptographic keys for encryption and decryption. When a certificate is used for signature, the certificate may include cryptographic keys for signing data. When a certificate is used for signature and encryption, the certificate may include a cryptographic key that may be used to (1) encrypt data, (2) decrypt data, (3) logon, or (4) digitally sign data. The certificate may be used as a secure delivery mechanism for a secret, such as a private key or a nonce. For example, the certificate may be used to exchange a public/private key pair along with a message digest and signature. The certificate may be used to authorize or authenticate data that is being exchanged with other devices.

Certificate Authority (CA): A CA may issue digital certificates that include a public key and an identity of the owner. The matching private key may not be made available publicly, but may be kept secret by the user who generated the key pair. The certificate is a validation by the CA that the public key in the certificate is associated with a particular person, a particular organization, or other particular entity identified in the certificate. A CA may verify the credentials of a particular device to enable other devices to trust the information in the CA's certificates. If a device trusts the CA and can verify the CA's signature, then the device can verify that a particular public key belongs to whoever is identified in the certificate.

Handshake Protocol: A handshake protocol (also called a handshake), such as a Secure Sockets Layer (SSL) handshake or a Transport Layer Security (TLS) handshake, may enable two devices to establish the secret keys with which they communicate. The steps involved in a handshake may include: (1) a first device sends to a second device a "initial hello" message that includes cryptographic information, (2) the second device responds with a "response hello" message that includes various information (e.g., session identifier, digital certificate, certificate request, etc.), (3) the first device verifies the digital certificate of the second device, (4) the first device sends a random byte string that enables both devices to compute the secret key to be used for encrypting subsequent message data (e.g., the random byte string itself may be encrypted with a public key of the second device), (5) if the second device sent a "certificate request", then the first device may send a random byte string encrypted with a private key of the first device, along with a digital certificate of the first device, (6) the second device may verify the certificate of the first device, (7) the first device may send the second device a "finished handshake" message (e.g., encrypted with the secret key) indicating that the first device's part of the handshake is complete), (8) the second device may send the first device a "finished handshake" message (e.g., encrypted with the secret key) indicating that the second device's part of the handshake is complete. For the duration of the session, the first device and the second device can exchange messages that are symmetrically encrypted with the shared secret key.

Nonce: A nonce is an arbitrary (e.g., random or pseudo-random) number that may be used only once in a cryptographic communication. The nonce may include a timestamp to enable a receiving party to determine whether the nonce is current (e.g., active) or whether nonce has expired.

Provisioning: Provisioning is a time period before a device is placed in a production (e.g., runtime) environment. For example, a device may be provisioned and later placed in a work environment, a school environment, or other environment. During provisioning, a device (or a target device) may be setup by configuring various parameters (e.g., configuring communication hardware and software). In some cases, during provisioning, a device (or a target device) may be provided with a certificate. By providing multiple devices with the same certificate when each device is provisioned, the multiple devices can trust each other, e.g., a particular device can trust any other device that has the same certificate. If an unknown device enters a network environment, the unknown device may not have the same certificate as the other multiple devices because the unknown device was not provisioned in the same way (or at the same time) that the multiple devices were provisioned. If the multiple devices determine that the unknown device does not have the same certificate as that of the multiple devices, then the multiple devices may not trust the unknown device.

Token: A token is a type of symmetric key. For example, a first device and a second device (or a server/gateway/cloud) may establish a trust relationship by determining that both devices have the same token. For example, the first device may send or encrypt a message using a first token (associated with the first device) to the second device and the second device may send or encrypt a message using a second token (associated with the second device) to the first device. The first device may compare the second token with the first token (or decrypt the second message using the first token), determine that the tokens are the same (e.g., identical) token, and establish a trust relationship with the second device. The second device may compare the first token with the second token (or decrypt the first message using the second token), determine that both devices are using the same token, and establish a trust relationship with the first device.

The systems and techniques described herein provide mechanisms for secure communications between multiple devices, including IoT devices, under different conditions, including (i) when a central gateway device is used to coordinate communications between the multiple devices and (ii) when the multiple devices create an ad-hoc mesh network to communicate with each other. The systems and techniques provide authorization based upon (i) the presence of one or more other devices, (ii) location, (iii) state, (iv) policies, and the like.

For example, in a home environment, a parent may desire to restrict a child's ability to access content via a target device, such as, for example, a streaming media player. Each member of the family may download a certificate for an application ("app") that is used to control the media player. The app may include parental controls that the parent can configure. For example, the parent may create a policy that enables a child to stream a first type of content (e.g., G-rated content) without the parent being present and requires that one parent be present if the child attempts to stream other types of content (e.g., PG-rated or higher). When the media player receives a request to stream content from the app executing on the child's device, the media player may determine the conditions of the policy and then determine the rating of the content being requested. The media player may stream the content if the content is G-rated. If the content is not G-rated, the media player may determine (e.g., based on the policy) if a second app is executing on a parent's device and if the parent's device is within a pre-determined distance (e.g., 10 feet) from the child's device. In this way, the child can access certain types of content only when at least one parent is nearby. In this example, the child's device has an app that has been provisioned and has been granted access to the media player. The child's device can access certain types of content using the media player when the parent is within a particular proximity and the child's device has a valid beacon secret. Thus, if the child brings a friend that has a device with the same app or borrows the friend's device, the friend's device does not have the beacon secret and cannot therefore be used to access certain types of content using the media player.

As another example, in a school environment, a teacher may desire to control access to a particular target device, such as a robotic arm. The teacher may provide each of the devices of students in a robotics class with a certificate to control the robotic arm. The teacher may create and provide a policy to each student's device that describes the conditions under which students can access the robotic arm. In a first policy example, the students may not be allowed to access the robotic arm unless a teacher (or a senior student) with valid credentials is also present, similar to how, in a family environment, the policy specifies that a parent be in proximity for a child to access certain types of media content using the media player. As a second policy example, the students may not be allowed to access the robotic arm unless a predetermined number of students are within a predetermined proximity to the robotic arm (e.g., within the same room). To illustrate, the robotics class may have N students and the policy may specify that M students (where M<N) be present for any one of the N students to access the robotic arm. Such a policy may be created to prevent a single student from using the robotic arm. By specifying in the policy that that M students be present, if an accident occurs and a student is injured, the remaining students can offer assistance or summon help.

Thus, the systems and techniques may include provisioning (e.g., providing a certificate to) a device, creating an appropriate policy, using a beacon to periodically send out a new secret (e.g., a NONCE), and specify a non-spoofable proximity of certain devices (e.g., a supervisor/manager or other employees) to prevent unauthorized (e.g., rogue) devices from accessing a network environment. The beacon may be an out of band transmission, a near field communications tag, or the like. The certificate may be provisioned by a server or locally (e.g., by a system administrator or other authorized personnel). The policy may be written to address a particular network environment and particular usages of devices within the particular network environment.

The policy may specify that when each device state (e.g., certificate, secret, proximity, or the like) is aligned with the policy, then access to a target device is authorized. For example, each device in a network environment may be (i) pre-provisioned (e.g., certificate provided by a server or by an administrator), (ii) granted permission to access one or more target devices, (iii) within a pre-determined proximity (e.g., distance) to the target device(s), to other device(s), or both, and (iv) have a valid token issued from a server, a cloud-based authority, a network gateway, or a trust fabric (e.g., of an ad-hoc network). The policy may specify whether authentication (e.g., in which a user authenticates by providing a valid username and password or a device authenticates by providing information, such as a valid beacon secret) is to be used. The policy may specify what happens when (i) an unauthorized (e.g., rogue) device is detected within a particular proximity to devices (including the target device) in the network environment, (ii) an unauthorized device attempts to communicate with a server, a cloud, a gateway or a trust fabric associated with the network environment, or (iii) one or more devices are missing (e.g., not within the predetermined proximity) when access to a target device is requested. For example, if an unauthorized device is detected, the network component (target device, other devices, gateway, etc.) that detects the unauthorized device may gather information associated with the unauthorized device, such as a unique address (e.g., media access control (MAC) address, internet protocol (IP) address, or other address), serial number, manufacturer, and the like and report the information to other devices in the network environment. To illustrate, the network component may directly broadcast the gathered information to devices in the network environment or the network component may provide the gathered information to a central component (e.g., server, gateway, or cloud service), and the central component may broadcast the gathered information to devices in the network environment. The devices in the network environment may, based on the information associated with the unauthorized device, ignore requests, messages, or other communications received from the unauthorized device. In some cases, the policy may specify that a minimum number of devices are to be present before any one of the devices can communicate with (e.g., control) the target device, or the policy may specify that a particular device (e.g., parent, supervisor, teacher, etc.) is to be present before any one of the devices can communicate with (e.g., control) the target device. For example, if there are less than the minimum of devices present or a particular device is not present, then the policy may specify that the target device is to ignore any communications (e.g., commands) from the devices. As another example, if there are less than the minimum of devices present or a particular device is not present, then the policy may specify that the target device can perform a reduced set (e.g., a subset) of the actions that the target device would perform. For example, in a school environment, if a teacher's device is detected in proximity to a target device (e.g., robotic arm), then a student's device may be used to control the robotic arm to perform any command. If a teacher's device is not detected within a particular proximity to the target device, then the target device may not respond to commands or the commands that the target device can perform under the control of the student's device may be limited. For example, the movements of the robotic arm may be restricted to a subset set of movements (e.g., up and down but not side to side) or the movements may be executed more slowly (e.g., by reducing a speed of the stepper motor used to control the limbs of the robotic arm) to reduce the possibility of accidents/injuries occurring.

The policy may specify how a device in a network environment connects with other devices. For example, two or more devices may engage in a handshake protocol in which the devices exchange (or encrypt using) one or more data items, such as a device secret (e.g., token), a beacon secret, or the like to prevent unauthorized devices from accessing the network environment, to create a secure communication path, and the like. To illustrate, in a school environment, the student devices, teacher device(s), and the target device may exchange handshakes (e.g., exchange tokens and beacon secrets) amongst each other to establish a trust relationship between the devices. The target device may determine whether the student devices and teacher device(s) satisfy the conditions of the policy, such as whether a minimum number of students are present, whether a teacher is present, and the like. The target device may respond to commands sent from one of the student's devices according to the policy.

The policy may specify how a device in a network environment connects (and establishes trust) with a gateway device, a server, or a cloud service associated with the network environment. Each device in the network environment may initially be provisioned (e.g., automatically by a server or manually by an administrator) to the gateway device, the server, or the cloud service. For example, each device may be provisioned with a certificate and with a policy specifying that each device performs a handshake with the server, the gateway, or the cloud to prevent unauthorized devices from gaining access (e.g., using spoofing or counterfeiting) to the network environment. The handshake may include each device exchanging (or encrypt using) one or more data items, such as a device secret (e.g., token), a beacon secret, or the like with the server, the gateway, or the cloud. The policy may include information regarding how a policy is inherited or shared (e.g., from one device to another device), how a communication path is established for future policy changes and updates, and the like. The policy may include information describing how a user may be registered with a particular device, how a user may be registered with the server, the gateway, or the cloud, and the like.

The systems and techniques described herein may provide the capability to detect and evaluate the status of devices connected to a network environment and determine authorization levels based on context. For example, the systems and techniques may be used to provide authorization to a user (or a user device) to view and edit a secure document after all cameras in the environment are disabled (e.g., such that even if a camera was hijacked by an unauthorized user, the camera would not provide any information about the secure document while it was being viewed or edited. As another example, the systems and techniques may be used to provide a user (or a user device) with access to a network resource when devices with access to external networks (e.g., wireless wide area network (WWAN)) are not connected to the network environment or when the access of the devices to the external networks is disabled. As yet another example, the systems and techniques may be used to provide a user (or a user device) with access to a local resource (e.g., media player, internet site, robotic arm, etc.) when a set of conditions are met (e.g., at least one parent is present, at least one teacher is present, etc.). As a further example, the systems and techniques may be used to cause robots (or other automated equipment) in a work environment to enter a repair mode (e.g., in which no movement is performed) when a human being (e.g., identified by the human's device) is on a shop floor or within a predetermined proximity to the robots. As another example, the systems and techniques may be used to send a security alert when an unauthorized device is detected in a network environment (e.g., by comparing enrolled vs unenrolled wireless traffic). To illustrate, a security alert may be generated when unauthorized access is attempted, such as for example: (i) when a child attempts to access media content that the child is not permitted to view in the absence of a parent's presence, (ii) when a student attempts to command the robotic arm in the absence of other students or at least one teacher, (iii) when an unauthorized device attempts to access a network in a workplace, and the like.

In some cases, the network components (e.g., devices, target devices, gateway/server/cloud, and the like) may establish a peer-to-peer trust relationship when each network component is initially provisioned (e.g., setup). In a network environment, the peer-to-peer trust relationship may be used to create a trust fabric that is immutable, except by a system administrator (or other authorized person). The devices may encounter and establish additional, (e.g., less trusted) relationships with new devices. The trust relationships may include relationships between a device and a gateway, a server, or a cloud associated with the network environment. For example, as in the case of a gateway or a hub that acts as an aggregator and/or arbiter at the device edge. In this example, device awareness and trust may be the same but may be managed by proxy. The systems and techniques described herein may enable trust between network components to be measured dynamically during runtime. For example, requests to access or operate a resource (e.g., target) may be authorized (e.g., granted) based on compliance with an environmental context specified in a policy. The environmental context may include information such as, for example, is the requesting device part of the trust fabric (e.g., was the device provisioned locally with an appropriate certificate), are the conditions of a policy that specifies proximity, beacon secret, etc. met, and the like. The environmental contexts may be combined and layered to increase or decrease restrictions based on environmental trust factors set by policy.

As a first example, a target device may include one or more processors and one or more non-transitory computer-readable storage media to store instructions executable by the one or more processors to perform various operations. The operations may include determining that each device of a plurality of devices includes a certificate, determining that each device of the plurality of devices is within a predetermined distance threshold from the target device, and granting the plurality of devices access to the target device based at least in part on determining that conditions of an access policy associated with the target device have been satisfied. The conditions of the policy may include a first condition specifying that each device of the plurality of devices includes the certificate and a second condition specifying that each device is within the predetermined distance threshold from the target device. The access policy may be stored in a memory of the target device. The target device may receive a message from a particular device of the plurality of devices and initiate an action based at least in part on (e.g., in response to) the message. The target device may determine that each device of the plurality of devices includes the certificate by performing a certificate-based handshake between each device of the plurality of devices and the target device. The predetermined distance threshold may include (i) a minimum distance between each device and the target device, (ii) a maximum distance between each device and the target device, or (ii) both (i) and (ii). Each device of the plurality of devices may perform a certificate-based handshake with other devices of the plurality of devices before being granted access to the target device. The target device may determine that an unauthorized device does not include the certificate or determine that the unauthorized device is within a predetermined distance threshold from the target device and create (and send) a security notification associated with the unauthorized device. A particular device of the plurality of devices may be provided with the certificate when the particular device is provisioned.

As a second example, a target device may include one or more processors and one or more non-transitory computer-readable storage media to store instructions executable by the one or more processors of a target device to perform various operations. The operations may include determining that each device of a plurality of devices includes a certificate, determining that each device of the plurality of devices includes a beacon secret, and granting each device of the plurality of devices access to the target device based at least in part on determining that conditions of an access policy associated with the target device have been satisfied. The conditions of the policy may include one or more of: a first condition that each device of the plurality of devices includes the certificate, a second condition that each device includes the beacon secret, or a third condition that each device is within a predetermined distance threshold from the target device. The target device may receive a message from a particular device of the plurality of devices and initiate an action based at least in part on the message. The target device may receive a new beacon secret broadcast by a beacon at a predetermined time interval and replace a beacon secret stored in the one or more non-transitory computer-readable storage media with the new beacon secret. The target device may determine that each device of the plurality of devices includes the certificate by performing a certificate-based handshake between the target device and each device of the plurality of devices. The target device may determine that an unauthorized device does not include the certificate, the beacon secret, or both and send a security notification indicating a presence of the unauthorized device.

FIG. 1 is a block diagram illustrating an architecture 100 that includes multiple devices according to some implementations. The architecture 100 may include multiple devices 102(1) to 102(N) (where N>0), one or more servers 104, a beacon 106, and one or more target devices 108 that are communicatively coupled with each other via a network 110. The network 110 may include an ad-hoc network (e.g., using peer-to-peer communications via a protocol such as, for example, Bluetooth®), a wireless network (e.g., using a WiFi® or other wireless protocol, such as 802.xx), a wired network (e.g., using Ethernet® or another wired communication protocol), a cellular network (e.g., Global System for Mobile (GSM), code division multiple access (CDMA) or the like), another type of communication protocol, or any combination thereof.

The servers 104 may be used to store various policies 112 and certificates 114. The policies 112 and certificates 114 may be deployed to the devices 102, the target devices 108, or both when the devices 102, 108 are provisioned. The server 104 may automatically (e.g., without human interaction) provision the devices by installing the policies 112 and the certificates 114 on the devices 102, the target devices 108, or both. A system administrator may provision the devices by installing the policies 112 and the certificates 114 on the devices 102, the target devices 108, or both. In some cases, the system administrator may provision the devices 102, 108 by downloading and installing the policies 112 and the certificates 114 from the server 104. Provisioning (e.g., providing a certificate) may be performed when a particular device is introduced into an environment. For example, a teacher may give each student's device a certificate to control a target device, such as a robotic arm. As another example, everyone in a family may download a certificate for a media streaming application (e.g., Netflix®, Hulu®, Prime®, HBO®, or the like) that has parental controls. The policy may be written such that a specific set of devices can be assigned to authorize access. Minimum required would be device is provisioned, granted access, in proximity, has valid token from server (see doc).

The beacon 106 may broadcast a (new) secret 138 to the devices 102, 108 at a predetermined time interval 116 (e.g., every P minutes, where P>0). The predetermined time interval 116 may vary according to the type of network environment. For example, in a network environment into which new devices are frequently being introduced, the predetermined time interval 116 may be relatively short (e.g., every minute, every hour, or every day). In a network environment into which new devices are infrequently being introduced, the predetermined time interval 116 may be relatively long (e.g., every week or every month). The beacon 106 may use an out-of-band mechanism to broadcast the (new) secret 138. For example, if the devices 102, 108 are connected via a wireless network, such as Wi-Fi®, the beacon 106 use Bluetooth® or other near field communication (NFC) mechanism to communicate the (new) secret 138 to devices within a particular proximity of the beacon 106. Thus, the beacon 106 may be used to broadcast the secret 138, such as a NONCE or a cryptographic key, to devices within a predetermined proximity to the beacon 106, such as the devices 102, 108. Devices, such as the devices 102, 108 that have received the most recently broadcast secret (e.g., the secret 138) from the beacon 106 may be capable of decrypting encrypted traffic (e.g., encrypted using the secret 138) and can trust the communication. Thus, even if a hacker is able to remotely access one of the devices 102, 108 in the network environment 100, the hacker may not be able to access other devices in the network environment because the hacker does not have the secret 138. The secret 138 may be a nonce, e.g., an arbitrary (e.g., random or pseudo-random) number that is used only once in a cryptographic communication. The secret 138 may include a timestamp indicating when the secret 138 was created to enable a determination to be made whether the secret 138 is current or whether it has expired. For example, in an environment where the beacon 106 sends a new secret every P minutes, the device 102(N) receives a communication (e.g., handshake or other message) from a sending device that includes a secret with a timestamp. The device 102(N) may determine a difference between (i) a current time and (ii) the timestamp of a secret used in the communication. If the difference is less than or equal to P, then the device 102(N) may determine (e.g., based on a policy) that the sending device can be trusted. If the difference is greater than P (e.g., the secret is no longer valid as a new secret was sent after P minutes), then the device 102(N) may determine (e.g., based on the policy) that the sending device cannot be trusted. The devices 102 and the target device 108 may send an acknowledgement message to the beacon 106 acknowledging receipt of the secret 138. The acknowledgement message may include a unique identifier (e.g., MAC address, serial number, or the like) that identifies the device that received the secret 138. In this way, the beacon 106 may keep track of which devices have received the secret 138. In some cases, the beacon 106 may determine a distance (proximity) of each of the devices 102 to the target device 108 using one or more geolocation techniques, such as, for example, an angle of arrival of the acknowledgement message, an arrival time of the acknowledgement message, a signal strength (e.g., each device receiving the secret 138 may determine a signal strength of the signal from the beacon 106 and indicate the signal strength in the acknowledgement message), a received signal phase (e.g., each device receiving the secret 138 may determine a signal phase of the signal from the beacon 106 and indicate the signal phase in the acknowledgement message), triangulation, or other geolocation technique.

Each of the devices 102(1) to 102(N) may include one or more of a policy, a certificate, a token, a secret, and a cryptography module to encrypt and decrypt data (e.g., based on the policy, the certificate, the token, the secret, or any combination thereof). For example, as illustrated in FIG. 1, the device 102(1) may include a policy 118(1), a certificate 120(1), a token 122(1), a secret 124(1), and a cryptography module 126(1) and the device 102(N) may include a policy 118(N), a certificate 120(N), a token 122(N), a secret 124(N), and a cryptography module 126(N). The tokens 122 may be a type of symmetric key. For example, a first device and a second device (or a server/gateway/cloud) may establish a trust relationship by determining that both devices have the same token. For example, the device 102(1) may receive a message (e.g., handshake) from the device 102(N) encrypted using the token 122(N) and determine whether the message can be decrypted using the token 122(1). If the token 122(1) can be used to decode a message from the device 102(N) that was encoded using the token 122(N), then the device 102(1) may trust the device 102(N). If the token 122(N) can be used to decode a message from the device 102(1) that was encoded using the token 122(1), then the device 102(N) may trust the device 102(1).

At least one target device 108 may include a policy 128, a certificate 130, a token 132, a secret 134, and a cryptography module 136. For example, in a home environment, the target device 108 may be a device to which access is controlled by a parent, such as a media playback device. In a work environment, the target device 108 may be a device to which access is controlled by a manager or supervisor, such as a storage device used to store confidential information. In a school environment, the target device 108 may be a device to which access is controlled by a teacher, such as a robotic arm. The policies 118, 128 may specify under what conditions the target device 108 will respond to a message (e.g., one or more of messages 148(1) to 148(N)) sent by one of the devices 102. The policies 118 may specify under what conditions one or more of the devices 102 will respond to a message (e.g., one or more of messages 148(1) to 148(N)) sent by another one of the devices 102. The policies 118, 128 may specify that a successful handshake with another device is a prerequisite to trusting the other device. For example, the messages 148 may include a request (or a command) to one of the devices 102, 108 to perform a particular action, such as initiate streaming a particular media content, retrieve particular data from a database, perform a particular set of commands by a robotic arm or other device, or the like. To illustrate, the target device 108 may receive a handshake message 144(N) and send a handshake message 146 to establish a trusted relationship between the device 102(N) and the target device 108. After establishing a trusted relationship, the target device 108 may receive the message 148(N) from the device 102(N) requesting that the target device 108 perform an action and the target device 108 may perform the action. Alternately, the target device 108 may receive the message 148(N) (e.g., a request to perform an action) from the device 102(N). In response, the target device 108 may send a handshake message 146 and may receive a handshake message 144(N) to establish a trusted relationship between the device 102(N) and the target device 108. After the trusted relationship is established, the target device 108 may perform the action(s) requested in the message 148(N).

The exchange of the handshake messages 44, 146 may be an automated process of negotiation to dynamically set parameters of a communications channel between two devices before normal communication via the channel begins. Thus, the establishment of the channel may precede additional communications, such as the messages 148. The handshaking process may establish rules for communication between two or more devices may be specified in the policies 118, 128. Handshaking may include negotiating parameters that are acceptable to devices on both ends of the communication channel, including an information transfer rate, a coding alphabet, how parity is handled, an interrupt procedure, and other protocol or hardware parameters.

In some cases, one or more external devices 140 may be connected, via the server 104 (e.g., a gateway device), to the devices 102, 108. If one of the external devices 140 is able to satisfy the conditions (e.g., handshake and the like) of the policy 128 of the target device 108, then the external device 140 may establish a trusted relationship with the target device 108, enabling the external device to send commands to the target device 108 to perform various actions. If one of the external devices 140 is able to satisfy the conditions (e.g., handshake and the like) of the policy 118 of one of the devices 102, then the external device 140 may establish a trusted relationship with one of the devices 102 and send messages to command one of the devices 102 to perform various actions. The policies 118, 128 may specify various levels of trust. For example, the policies 118, 128 may specify three levels of trust, high, medium, and untrusted. A device that establishes a high level of trust may be provided with unrestricted access (e.g., streaming any type of media content, read/write access to a database, sending any command to a robotic arm, and the like). A device that establishes a medium level of trust may be provided with restricted access (e.g., streaming particular types of media content, read-only or write-only access to particular portions of a database, sending of a subset of commands to a robotic arm, a proximity of a parent, a supervisor/manager, a teacher or other students, and the like). When a particular device of the devices 102, 108 determines that an unauthorized device 142 is untrusted (e.g., because the unauthorized device 142 does not comply with the policies 118, 128), the particular device may report the unauthorized device 142 to others of the devices 102, 108, create a security log, notify a system administrator, perform another action, or any combination thereof. Of course, more than three levels of trust or less than three levels of trust may be used.

A policy of a device may specify that when a state of one or more other devices satisfies the policy, then the other devices may be authorized to access the device. For example, the policy 128 of the target device 108 may specify that when a state (e.g., certificates 120, tokens 122, secrets 124, proximity of each of the devices 102 to the target device 108, or the like) of the devices 102 satisfies (e.g., aligns with) the policy 128, then the devices 102 may be authorized to access the target device 108. To illustrate, to gain access to the target device 102, the target device 108 may determine that the devices 102 have been (i) pre-provisioned (e.g., by the server 104 or by an administrator), (ii) granted permission to access the target device 108, (iii) determined to be within a pre-determined proximity (e.g., distance) to the target device 108, and (iv) have a valid token 122 issued from the server 104 (e.g., a cloud-based authority, a network gateway, or a trust fabric of an ad-hoc network). The policy 128 may specify whether authentication, in which a user authenticates by providing a valid username and password or a device authenticates by providing information, such as a valid beacon secret 124, is to be used. The policy 128 may specify what happens when (i) the unauthorized device 142 is detected within a particular proximity to one or more of the devices 102, 108, (ii) the unauthorized device 142 attempts to communicate with the server 104 (e.g., a cloud, a gateway or a trust fabric associated with the network environment), or (iii) one or more devices are not within the specified proximity when access to the target device 108 is requested. For example, if the unauthorized device 142 is detected, the network component (the target device 108, devices 102, server 104, or other component) that detects the unauthorized device 142 may gather information associated with the unauthorized device 142, such as a unique address (e.g., MAC address, IP address, or other address), serial number, manufacturer, and the like and report the information to the other devices in the architecture 100. To illustrate, the network component may directly broadcast the gathered information to other devices in the network environment or the network component may provide the gathered information to a central component (e.g., the server 104), and the central component may broadcast the gathered information to devices in the network environment. The devices in the network environment may, based on the information associated with the unauthorized device 142, ignore requests, messages, or other communications received from the unauthorized device 142.

The policies 118, 128 may specify that a minimum number of devices are to be present before any one of the devices 102 are authorized to access the target device 108, or the policies 118, 128 may specify that a particular device having higher access privileges (e.g., associated with a parent, a supervisor/manager, a teacher, etc.) is to be present before any one of the devices 102 are authorized to access the target device 108. For example, if less than the minimum of devices are present or a particular device having higher access privileges is not present, then the policy 128 may specify that the target device 108 is to ignore any communications from the devices 102 and/or create a security log identifying the access attempt. As another example, if less than the minimum of devices are present or a particular device with higher access privileges is not present, then the policy 128 may specify that the target device can perform a reduced set (e.g., a subset) of the actions that the target device 108 would perform. For example, in a school environment, if a teacher's device is detected in proximity to a target device (e.g., robotic arm), then a student's device may be used to control the robotic arm to perform any command. If a teacher's device is not detected within a particular proximity to the target device, then the target device may not respond to commands or the commands that the target device can perform under the control of the student's device may be limited. For example, the movements of the robotic arm may be restricted to a subset set of movements (e.g., up and down but not side to side) or the movements may be executed more slowly (e.g., by reducing a speed of the stepper motor used to control the limbs of the robotic arm) to reduce the possibility of accidents/injuries occurring.

Each of the policies 118, 128 may specify how a device in the network environment is able to establish a trusted relationship with other devices. For example, two or more devices may engage in a handshake protocol 144, 146 in which the devices exchange (or encrypt using) one or more data items, such as a device secret (e.g., token 122), a beacon secret (e.g., secret 124), or the like to prevent unauthorized devices from accessing the network environment, to create a secure communication path, and the like. To illustrate, in a school environment, the student devices, teacher device(s), and the target device may exchange handshakes 144, 146 (e.g., exchange tokens and/or beacon secrets) amongst each other to establish a trust relationship between the devices. The target device 108 may determine whether the student devices and teacher device(s) (e.g., the devices 102) satisfy the conditions of the policy 128, such as whether a minimum number of student devices are within a predetermined proximity to the target device 108, whether a teacher's device is within a predetermined proximity to the target device 108, and the like. The target device 108 may respond to messages (e.g., requesting the target device 108 to perform particular actions) sent from one of the student's devices when the conditions of the policy are satisfied.

The policies 118, 128 may specify how a corresponding device 102, 108 establishes a trusted relationship with the server 104, a gateway device, or a cloud service associated with the network environment. Each device 102, 108 may initially be provisioned (e.g., automatically by a server or manually by an administrator) to the server 104, the gateway device, or the cloud service. For example, each of the devices 102, 108 may be provisioned with a corresponding policy 118, 128 that specifies how a trusted relationship is established with other devices, including how the devices 102, 108 perform a handshake with the server 104, the gateway, or the cloud to prevent unauthorized devices from gaining access (e.g., using spoofing or counterfeiting) to the network environment. The handshakes 144, 146 may include each device exchanging (or encrypt contents of messages using) one or more data items, such as the token 122, the beacon secret 124, or the like with the server 104, the gateway, or the cloud. The policies 118, 128 may include information regarding how a policy is inherited or shared (e.g., from one device to another device), how a communication path is established for future policy changes and policy updates, and the like. The policies 118, 128 may include information describing how a user may register (e.g., become associated with) a particular device and how a user may register (e.g., become associated with) with the server 104, the gateway, or the cloud.

The policies 118, 128 may provide the devices 102, 108 with the ability to detect and evaluate the status of other devices connected to the network 110 and determine authorization levels based on context (e.g., certificate, token, secret, proximity, etc). For example, a policy may provide that a user (or a user device) is authorized to view and edit a secure document after all cameras in the environment are disabled (e.g., such that even if a camera was hijacked by an unauthorized user, the camera would not provide any information about the secure document while it was being viewed or edited). As another example, a policy may provide a user (or a user device) with access to a network resource when devices with access to external networks (e.g., wireless wide area network (WWAN)) are not connected to the network environment or when the access of the devices to the external networks is disabled (e.g., each device's network adapters is inactive or disabled by deleting a device driver). As yet another example, a policy may provide a user (or a user device) with access to a local resource (e.g., media player, internet site, robotic arm, etc.) when a set of conditions are met (e.g., at least one parent is present, at least one teacher is present, etc.). As a further example, a policy may cause robots (or other automated equipment) in a work environment to enter a repair mode (e.g., in which no movement is performed) when a human being (e.g., identified by a device associated with the human) is on a shop floor or within a predetermined proximity to the robots. As another example, a policy may instruct a device to send a security alert when the unauthorized device 142 is detected in a network environment (e.g., by comparing traffic from trusted devices with traffic from untrusted devices). To illustrate, a security alert may be generated when unauthorized access is attempted, such as for example: (i) when a child attempts to access media content that the child is not permitted to view in the absence of a parent's presence, (ii) when a student attempts to command the robotic arm in the absence of other students or at least one teacher, (iii) when an unauthorized device attempts to access a restricted resource (e.g., confidential data stored in a database) in a workplace, and the like.

The network components (e.g., devices 102, target devices 108, server 104, gateway, or cloud, and the like) may establish a peer-to-peer trust relationship after each network component is initially provisioned (e.g., setup). In a network environment, the peer-to-peer trust relationship may be used to create a trust fabric (e.g., part of the network 110) that is immutable, except by a system administrator (or another authorized person). The devices 102, 108 may encounter and establish additional, (e.g., less trusted) relationships with new devices (e.g., the external devices 140). The trust relationships may include relationships between one of the devices 102, 108 and the server 104 (or a gateway, or a cloud) associated with the network environment. For example, assume the server 104 includes a gateway or a hub that acts as an aggregator and/or arbiter at the device edge. In this example, device awareness and trust may be the same but may be managed by proxy. The policies 118, 128 may specify how trust between network components may be measured dynamically during runtime. For example, requests to access or operate a resource (e.g., the target device 108) may be authorized (e.g., granted) based on compliance with an environmental context specified in the policy 128. The environmental context may include information such as, for example, whether the requesting device is part of the trust fabric (e.g., was the device provisioned locally), whether the conditions of a policy (e.g., the policy 128), that specifies device proximity, beacon secret, etc. have been satisfied, and the like. The environmental contexts may be combined and layered to increase or decrease restrictions based on environmental trust factors set by the policies 118, 128.

In some situations, the server 104 may not be present. The network 110 may be an ad-hoc network created based on the trust fabric between the devices 102, 108. The trust fabric may be established during the provisioning of the devices 102, 108. In a school environment, the student devices 102(1) to 102(N) may be provisioned with the policy 118 that specifies that at least 4 (4<N) students must be present for the target device 108 (e.g., robotic arm) to respond. Thus, when one of the devices 102(M) (where 0<M<5) sends the message 148(M) that includes a set of commands, the target device 108 may perform the set of commands. However, if the unauthorized device 142 is able to access one of the student devices, such as the device 102(1), and send the message 148(1) to the target device 108, the target device 108 may not respond to the message 148(1) because the unauthorized device 142 is not part of the trust fabric.

In other situations, the server 104 may be present. For example, the server 104 may be a gateway device to enable access to external networks, external devices, and a data backhaul. The network 110 may be an ad-hoc network among the devices 102, 108 and the server 104, or the network 110 may be a conventional network (e.g., Wi-Fi®). In a work environment, the devices 102(1) to 102(N) may be provisioned with the policy 118 that specifies that the server 104 (e.g., gateway) is "unlocked" to provide access to external networks, external devices, and data backhaul when trusted devices are present in the network 110. Thus, if the devices 102, 108 are present, then the network 110 may be unlocked to enable access to external networks, external devices, and data backhaul. However, if the unauthorized device 142 is determined to be present (e.g., determined to be accessing the network 110), the server 104 may remain "locked" and prevent access to external networks, external devices, and data backhaul because the unauthorized device 142 is not trusted. The unauthorized device 142 may be untrusted because the unauthorized device 142 was not able to perform (e.g., satisfy) the handshake protocol. For example, the unauthorized device 142 may not have access to the current beacon secret 124 and may therefore be unable to provide the beacon secret 124 during the handshake process.

Thus, an authorization scheme may use device previsioning and proximity/location of devices to target devices. Devices in a network (e.g., either an ad-hoc network or a conventional network) may be detected and evaluated to determine contextual authorization levels (e.g., based on device previsioning and proximity/location). Using device authentication in this way may reduce the usage complexity, make authentication less error-prone, and provide increased security compared to conventional security schemes. Devices may establish a peer-to-peer trust relationship during (or after) each device is provisioned. In production mode (e.g., runtime), the trust fabric may be immutable (except by system administrator intervention). The devices may encounter and establish additional (e.g., less trusted) relationships with new/added devices. Trust relationships may include device-to-device and device-to-machine, such as devices connecting to a "machine", such as a server, a gateway/, or a hub acting as an aggregator or arbiter at the device edge. In this example, device awareness and trust may be the same but may be managed by proxy. In this way, device configuration trust can be measured dynamically in production (e.g., runtime) and requests (e.g., requests to access or operate a resource, such as a target device) can be authorized and granted based on environmental context. These contexts may be combined and layered to ratchet up or down restrictions based on environmental trust factors set by policy.

Figure 2:
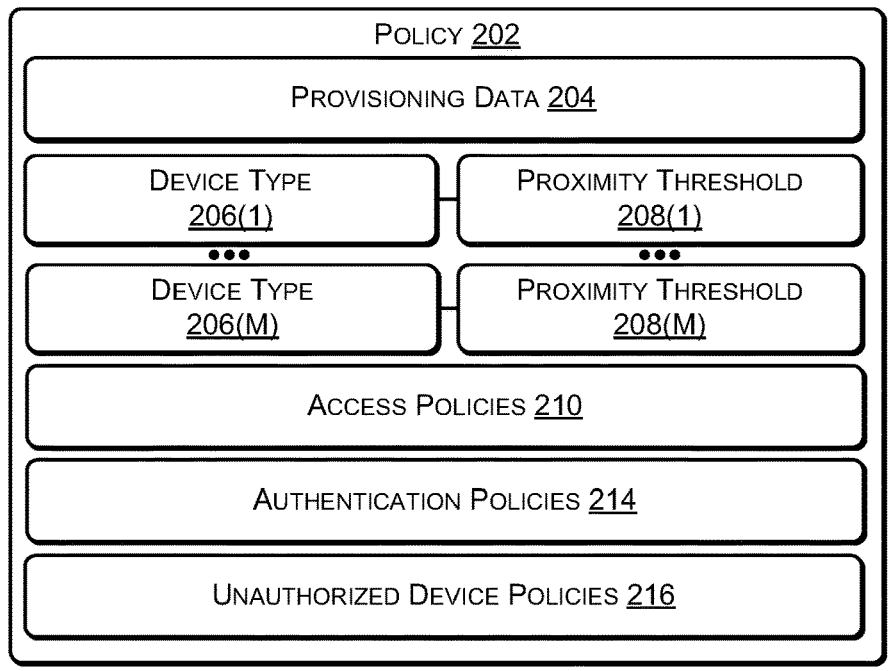
FIG. 2 is a block diagram illustrating an architecture that includes components of a policy according to some implementations.
Figure 2:
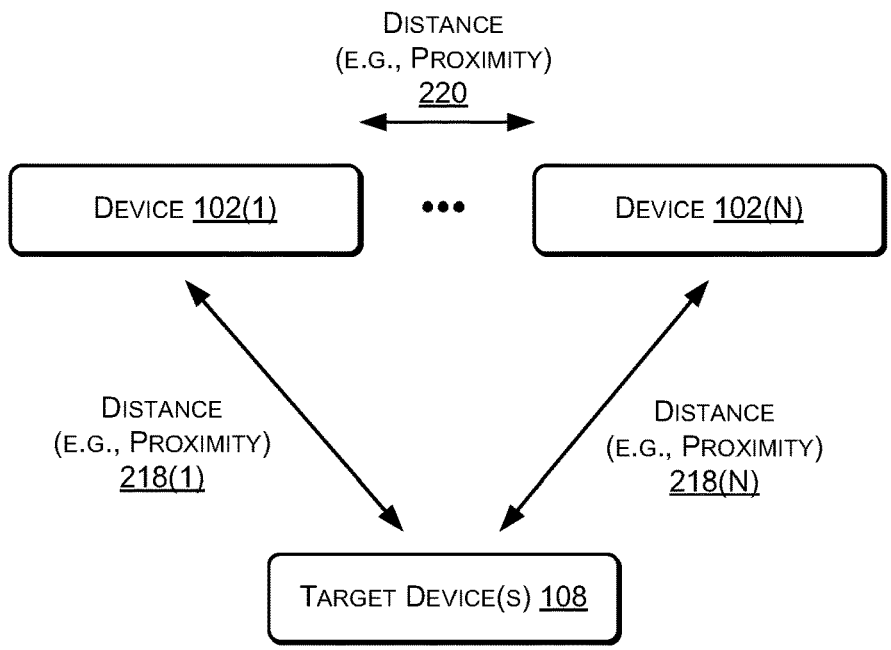

FIG. 2 is a block diagram illustrating an architecture 200 that includes components of a policy according to some implementations. A policy 202 may be deployed to the devices 102, 108 when they are initially provisioned. In addition, the policy 202 may be updated after being initially deployed. For example, the policy 202 may be stored at the server 104 of FIG. 1 (e.g., as the policy 112) and may be deployed to the devices 102 (e.g., as the policy 118) and to the target device 108 (e.g., as the policy 128). When the conditions specified in the policy are satisfied (e.g., met) then devices (e.g., the devices 102 of FIG. 1) may be granted access to a target device (e.g., the target device 108). When the conditions specified in the policy are not satisfied (e.g., not met) then the devices (e.g., the devices 102 of FIG. 1) may be denied access to the target device (e.g., the target device 108).

The policy 202 may include provisioning data 204, device types 206(1) to 206(M) (where M>0), proximity thresholds 208(1) to 208(M) (e.g., corresponding to each of the device types 206), access policies 210, and unauthorized device policies 216.

The provisioning data 204 may include information associated with the provisioning of a particular device (e.g., one of the devices 102, 108) where the policy is being stored. The provisioning data 204 may include a date, information (e.g., such as a serial number, MAC address, or other unique identifier) associated with each of the other devices that were provisioned at approximately the same time, data associated with a work environment where the device will be used, other provisioning-related information, or any combination thereof. The provisioning data 204 may be used to establish a trust fabric of an ad-hoc (e.g., peer-to-peer) network. For example, as part of a handshake protocol, the devices 102, 108 may exchange a unique identifier (e.g., MAC address, serial number, or the like) associated with each device. Each device may receive the unique identifier associated with other devices and compare the unique identifier with the provisioning data 204 to determine which of the other devices are to be trusted. For example, other devices whose unique identifier is included in the provisioning data 204 may be trusted while other devices may not be trusted. Only those devices that trust each other (e.g., based on the unique identifiers in the provisioning data) may create the trust fabric of the ad-hoc network.

The device type 206(1) may have the associated proximity threshold 208(1) and the device type 206(M) may have the associated proximity threshold 208(M). The device types 206 may specify the types of devices that are to be present and the proximity thresholds 208 may specify a distance range, a minimum distance, a maximum distance, or any combination thereof that the device types are to have to satisfy the policy 202. For example, the policy 202 may specify that the devices 102 are to be within a particular distance range (e.g., between 4 and 15 feet) from the target device 108. To illustrate, in a school environment, the policy 202 may specify that devices of the students and teacher(s) are to be a minimum distance away from the target device (e.g., robotic arm) to prevent the target device from accidently causing harm to the students and teacher(s) when the target device moves. As another example, in a home environment, the device type 206(M) may specify that a parent device type is to be within the proximity threshold 208(M) to grant a child's device access to a restricted access resource, such as a media playback device. In a work environment, the device type 206(M) may specify that a supervisor (or manager) device type is to be within the proximity threshold 208(M) to grant an employee's device access to a restricted access resource, such as a database storing confidential data. In a school environment, the device type 206(M) may specify that a teacher device type is to be within the proximity threshold 208(M) to grant a student's device access to restricted access resource, such as a robotic arm. Alternately or in addition, in a school environment, the device types 206 may specify that P other student device types (where 0<P<N) are to be within the proximity thresholds 208 to grant a particular student's device access to a restricted access resource, such as a robotic arm. The proximity thresholds 208 may specify a minimum distance, a maximum distance, or both of (i) a device to the target device (e.g., distance of device 102(N) to target device 108), (ii) a device to least one other device (e.g., distance of device 102(1) to target device 102(N)), (iii) a device to a server or gateway (e.g., distance of device 102(N) to the server 104), or any combination thereof. For example, in a school environment, the device types 206 and proximity thresholds 208 may specify that a teacher device be present and at least P student device types. As another example, in a work environment, the device types 206 and proximity thresholds 208 may specify that a gateway is accessible when the employee device types are all within a first particular distance from the resource and a manager (or a supervisor) device is within a second particular distance from the resource. In some cases, the device types 206 may specify an access privilege level, such as, for example, a highest privilege level, a teacher privilege level, a parent privilege level, a student privilege level, or the like. For example, multiple P privilege levels (where P>0) may be defined, with a higher privilege level having greater access privileges than a lower privilege level.

The access policies 210 may specify the conditions that when satisfied enable a particular device (or set of devices) to access a restricted access resource. For example, the conditions may include the number of device types and the corresponding proximity thresholds that are to be satisfied before access is granted, under what conditions unknown devices can be granted access, and the like.

The authentication policies 214 may specify under what conditions user authentication is to be performed, how to authenticate unknown devices, how to perform a handshake protocol, and other authentication-related policies. For example, one of the authentication policies 214 associated with the handshake protocol may specify how a device initiates the handshake, how a device responds to a request to perform the handshake, what data is exchanged during the handshake, whether encryption is used during the handshake, what type of encryption is used during the handshake, and the like.

The unauthorized device policies 216 may specify whether or not unauthorized devices are granted access to particular resources, what type of access (e.g., read-only, write-only, or the like) they are granted if they are granted access, the types of resources for which access can be granted to unauthorized devices, and actions to be performed when an unauthorized device is detected. For example, when device detects an unauthorized device, the device may create a security log, notify a system administrator, notify other devices in the network environment, notify a server (causing the server to notify other devices in the network environment, notify a system administrator, etc.), ignore requests from the unauthorized device, another type of action, or any combination thereof.

The proximity thresholds 208 may specify a distance 218(1) between the device 102(1) and the target device 108, a distance 218(N) between the device 102(N) and the target device 108, a distance 220 between two devices (e.g., between the device 102(1) and the device 102(N)), another distance (e.g., between a device and a server), or any combination thereof. The distances 218, 220 may be a minimum distance, a maximum distance. a distance range (e.g., both a minimum and a maximum), or any combination thereof.

Thus, a policy may specify various conditions under which a particular device can trust one or more additional devices, under which conditions access to a target device or a gateway can be granted, under which conditions access to a restricted access device can be granted, or the like. The policy may include provisioning data that may be used by devices to establish a trusted relationship with other devices. In some cases, multiple devices that trust each other may create a trust fabric (e.g., ad-hoc network) among the multiple devices based on the provisioning data. The policy may specify various devices types (e.g., parent, teacher, student, employee, manager, supervisor, or the like) and a proximity threshold for each device type. For example, a policy to control a robotic arm may be satisfied when at least three other student device types are within a corresponding proximity threshold, when at least one teacher student device type is within a corresponding proximity threshold, or both. The proximity thresholds may be expressed as a minimum distance, a maximum distance, or a distance range (e.g., minimum and maximum distance). The policy may include access policies that describe when access to a restricted access resource is granted, what type of access is granted under what conditions, when access may be denied, etc. For example, when trusted devices are within the proximity thresholds, full access may be granted. As another example, if not all the trusted devices are within the proximity thresholds, then partial access may be granted or access may be denied. As yet another example, if an untrusted device is present in the network environment, limited access may be granted or access may be denied. The policy may include authentication policies describing whether user authentication, in which each user provides a user name and password, is to be used and under what conditions user authentication is to be used. The policy may describe unauthorized device policies describing what actions may be undertaken when an unauthorized device is detected. For example, when an unauthorized device is detected, the unauthorized device may be locked out of the network, a security log may be generated, a system administrator may be notified, other devices in the network environment may be notified, a server may be notified (and the server may notify other devices in the network environment), partial access to a restricted access resource may be granted, another action, or any combination thereof.

In the flow diagrams of FIGS. 3, 4, 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, 600, and 700 are described with reference to FIG. 1 and FIG. 2, as described above, although other models, frameworks, systems and environments may implement these processes.

Figure 3:
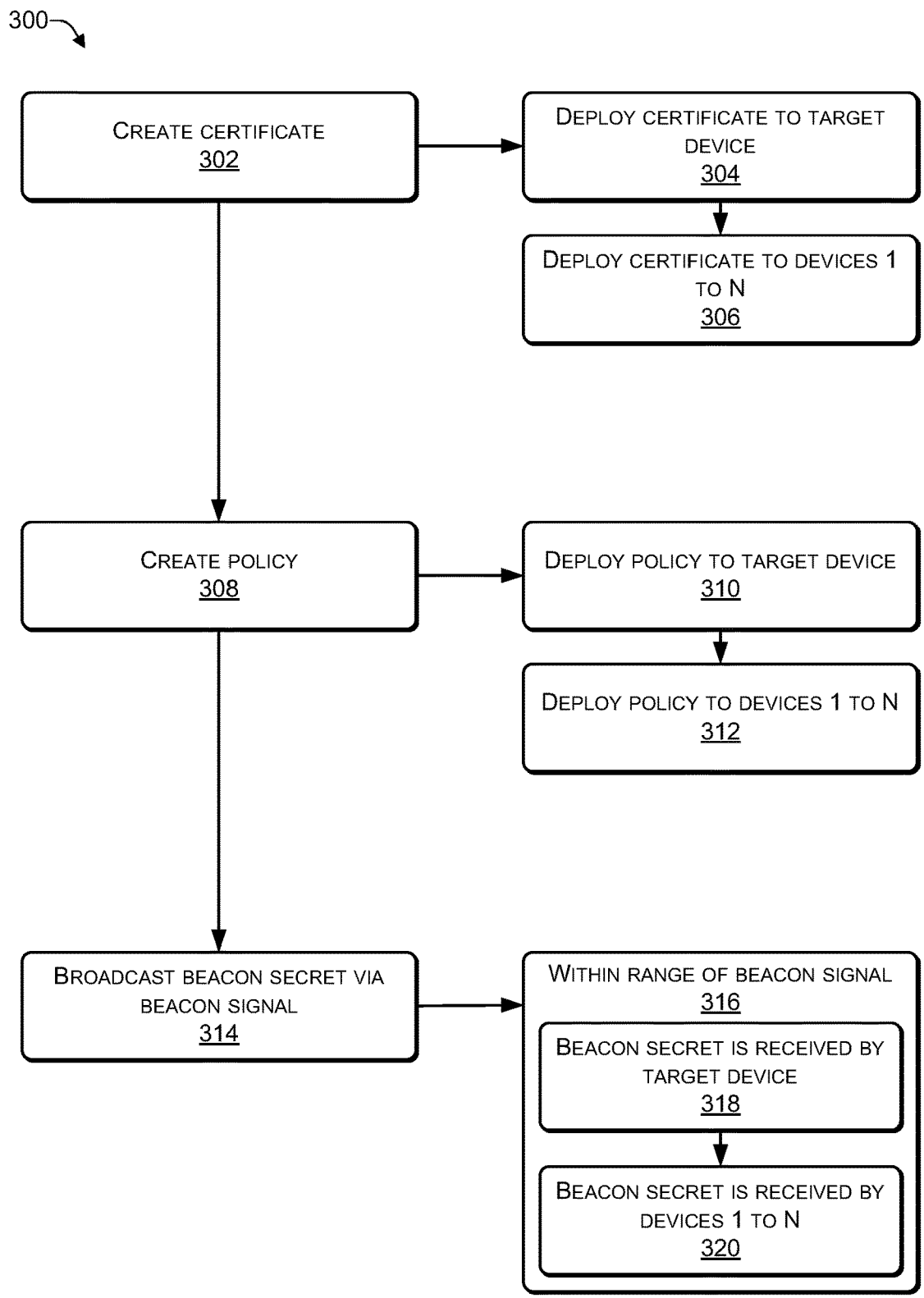
FIG. 3 is a flowchart of a process that includes provisioning one or more devices according to some implementations.

FIG. 3 is a flowchart of a process 300 that includes provisioning one or more devices according to some implementations. The process may be performed by one or more network components (e.g., the server 104 or the beacon 106) of FIG. 1.

At 302, a certificate may be created. At 304, the certificate may be deployed to at least one target device (e.g., the target device 108). At 306, the certificate may be deployed to one or more devices (e.g., devices 102(1) to 102(N) of FIG. 1). 302, 304, and 306 may be performed when a device is provisioned. For example, in FIG. 1, one or more certificates may be created and deployed to the devices 102 as the certificates 120 and to the target device 108 as the certificate 130. The certificate may be a type of electronic credential used to identify a device (or a user of the device) on a network, similar to how a driver's license tis used to identify a person. The certificate may include a public key and an identity of an owner of the certificate. The certificate may be issued by one or more certification authorities (CAs) that validate the identity of the certificate-holder both before the certificate is issued and each time the certificate is used. The primary uses of the certificate may include (i) encryption, (ii) signature, (iii) signature and encryption, or any combination thereof. When a certificate is used for encryption, the certificate may include cryptographic keys for encryption and decryption. When a certificate is used for signature, the certificate may include cryptographic keys for signing data. When a certificate is used for signature and encryption, the certificate may include a cryptographic key that may be used to (1) encrypt data, (2) decrypt data, (3) logon, or (4) digitally sign data. The certificate may be used as a secure delivery mechanism for a secret, such as a private key or a nonce. For example, the certificate may be used to exchange a public/private key pair along with a message digest and signature. The certificate may be used to authorize or authenticate data that is being exchanged with other devices.

At 308, a policy may created. At 310, the policy may be deployed to at least one target device (e.g., the target device 108). At 312, the policy may be deployed to one or more devices (e.g., the devices 102(1) to 102(N)). 308, 310, and 312 may be performed when a device is provisioned. For example, the policy 202 of FIG. 2 may be created and deployed to the devices 102 as the policy 118 and to the target device 108 as the policy 128. Each policy may specify conditions that when satisfied enable access to a restricted access resource (e.g., media playback device, robotic arm, gateway to external networks, database with confidential information, or the like). If the conditions of the policy are not satisfied, access to the resource may be denied or limited access may be provided, based on the policy.

At 314, a beacon secret may be broadcast using a beacon signal. At 316, devices within the range of the beacon signal may receive the beacon secret. For example, at 318, at least one target device may receive the beacon secret and, at 320, the one or more devices (e.g., devices 102(1) to 102(N)) may receive the beacon secret. For example, in FIG. 1, the beacon 116 may broadcast the secret 138 at the time interval 116. The secret 128 may be received by the devices 102(1) to 102(N) and by the target device 108. Broadcasting the secret 138, that changes at the predetermined time interval 116, may enable local devices, such as the devices 102, to access the target device 108. However, the unauthorized device 142 may not be local and may be unaware that a secret is to be used during certain types of transmissions (e.g., such as when sending the handshakes 144). For example, if the unauthorized device 142 is able to access the network 110, the unauthorized device 142 may be unable to provide a secret and may therefore be unable to access the target device 108. As another example, if the unauthorized device 142 is able to access a device, such as the device 102(1), the unauthorized device 142 may be unaware that a secret is to be provided and may therefore be unable to access the target device 108.

Figure 4:
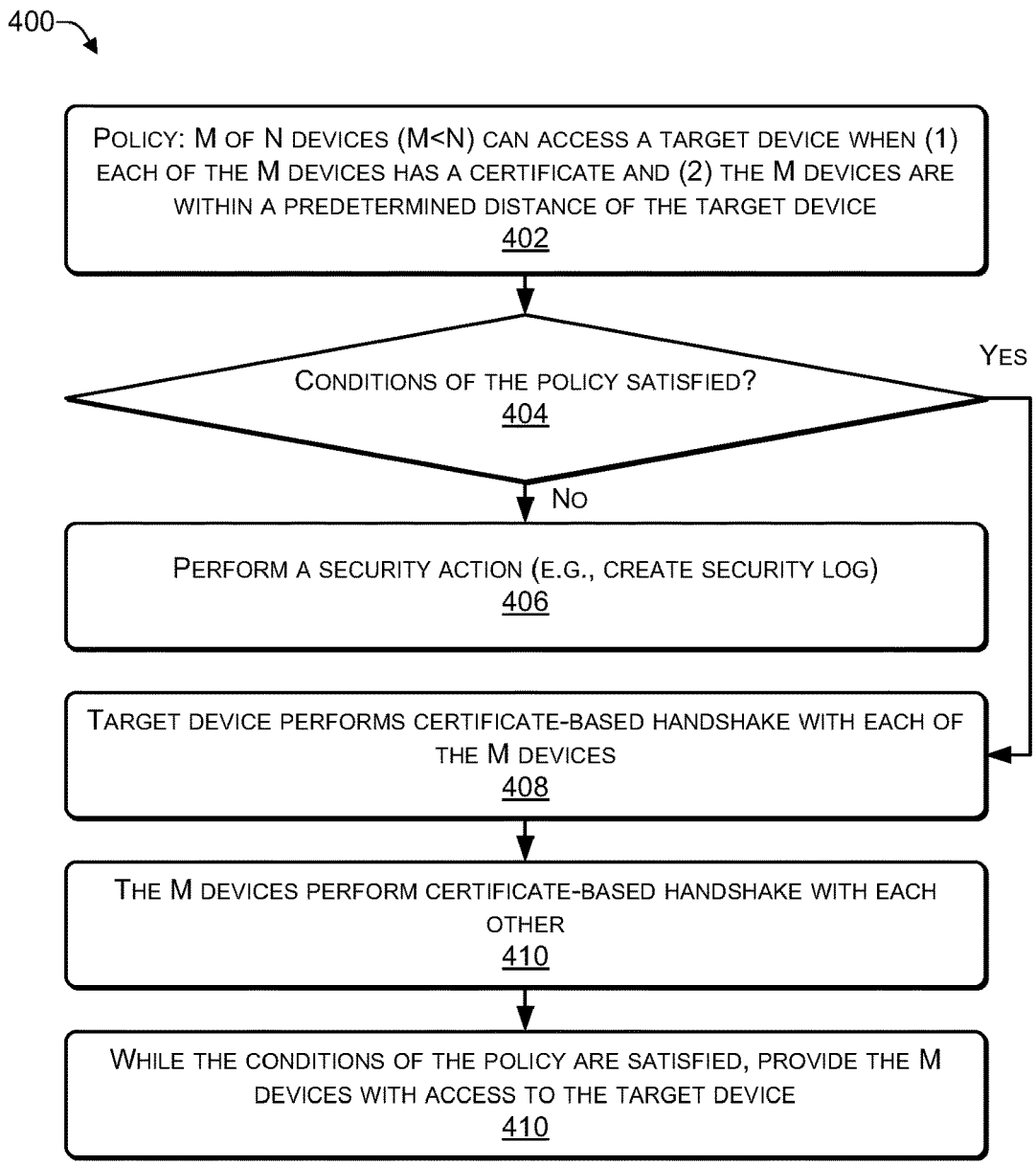
FIG. 4 is a flowchart of a process that includes determining whether one or more devices comply with a policy that includes a proximity condition according to some implementations.

FIG. 4 is a flowchart of a process 400 that includes determining whether one or more devices comply with a policy that includes a proximity condition according to some implementations. The process 400 may be performed by one or more of the devices 102, 108.

At 402, a policy may specify that M of N devices (where 0<M<N) can access a target device when the following conditions are satisfied: (1) each of the M devices has a certificate and (2) the M devices are within a predetermined distance threshold (e.g., with a minimum distance, a maximum distance, or a distance range) of the target device. For example, for safety reasons, a policy may specify that at least 4 students out of a class of 8 are to be present for one of the 4 students to be able to access a robotic arm. The policy may be stored in a memory of each device (e.g., the devices 102, 108 of FIG. 1).

At 404, a determination may be made whether the conditions of the policy have been satisfied. If a determination is made, at 404, that the conditions of the policy have not been satisfied then, at 406, one or more actions may be performed. For example, if the conditions of the policy are not satisfied (e.g., less than M devices are within the specified proximity) and one of the devices attempts to access the target device, then the target device may perform one or more actions, such as, for example, creating a security log, notifying a person in authority (e.g., system administrator, manager/supervisor, parent, or the like), shutting down the target device for a period of time, another action, or any combination thereof. The security log may include a timestamp, the identities of proximate devices (e.g., the less than M devices), an identity of the device that attempted to access the target device, the command (or other request) sent to the target device, other relevant information, or any combination thereof. The notification may take the form of an email, a text message, or other communication.

If a determination is made, at 404, that the conditions of the policy are satisfied, then the process proceeds to 408, where the target device may perform a certificate-based handshake with each of the M devices. In some cases, the certificate-based handshake may be performed over a local wireless (e.g., Wi-Fi®, Bluetooth®, or the like) network. For example, the certificate-based handshake may be performed over an ad-hoc network to prevent unauthorized devices may accessing information related to the handshake.

At 410, the M devices may perform a certificate-based handshake with other devices. For example, in FIG. 1, the device 102(1) may perform a certificate-based handshake with the devices 102(2) to 102(N) and so on.

At 412, while the conditions of the policy are satisfied, the M devices may be provided with access to the target device. The target device may determine whether the conditions of the target device's policy are satisfied and grant (or deny) access accordingly. For example, in a school environment, while the M student devices remain within the proximity specified by the policy, the target device may grant each of the M devices access to the target device (e.g., robotic arm). If the target device determines that the conditions of the policy are no longer satisfied, then the target device may deny or reduce the access for the student devices. For example, if an unknown or unauthorized (e.g., lacks appropriate certificate) device is detected within a particular proximity of the target device then the conditions of the policy may no longer be satisfied and access to the target device may be denied or restricted. As another example, if at least one of the M devices moves outside the proximity specified in the policy then the conditions of the policy may no longer be satisfied and access to the target device may be denied or restricted.

Figure 5:
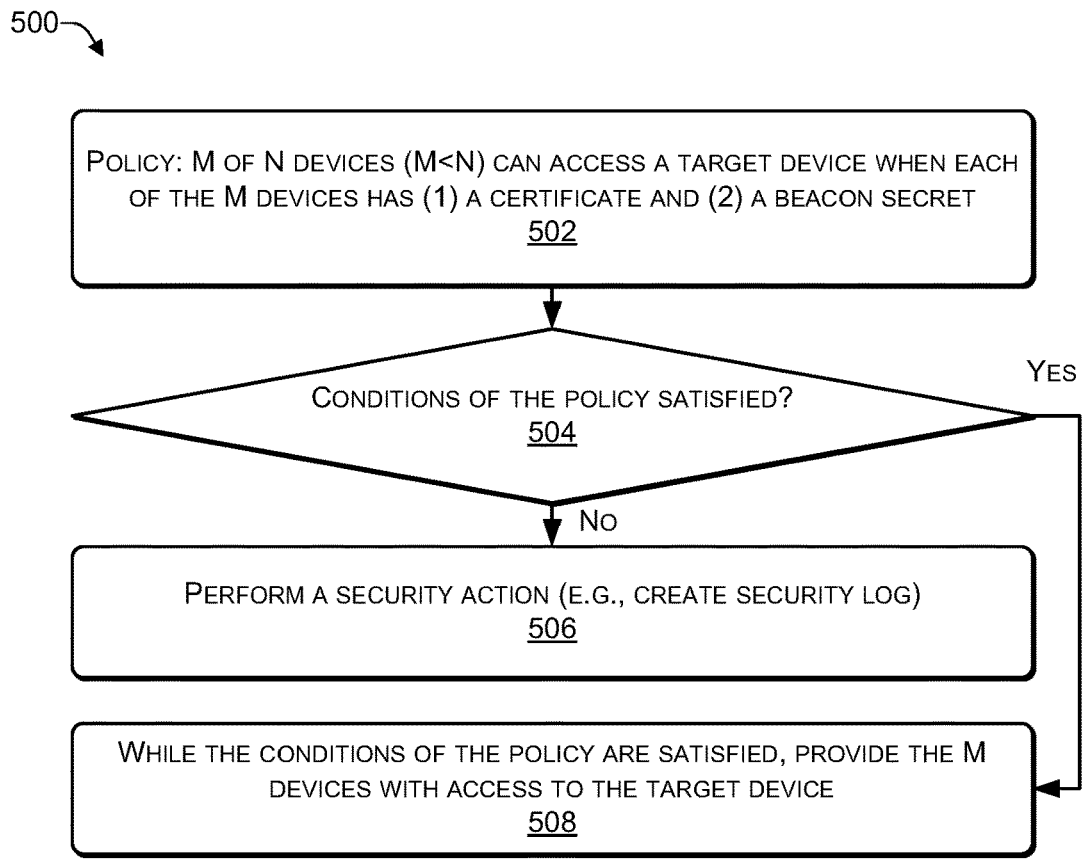
FIG. 5 is a flowchart of a process that includes determining whether one or more devices comply with a policy that includes a beacon secret condition according to some implementations.

FIG. 5 is a flowchart of a process 500 that includes determining whether one or more devices comply with a policy that includes a beacon secret condition according to some implementations. The process 500 may be performed by one or more of the devices 102, 108.

At 502, a policy may specify that M of N devices (where 0<M<N) can access a target device when the following conditions are satisfied: (1) each of the M devices has a certificate and (2) each of the M devices has a beacon secret. The policy may be stored in a memory of each device (e.g., the devices 102, 108 of FIG. 1).

At 504, a determination may be made whether the conditions of the policy have been satisfied. If a determination is made, at 504, that the conditions of the policy have not been satisfied then, at 506, one or more actions may be performed. For example, if the conditions of the policy are not satisfied (e.g., each of the M devices do not have a certificate or a beacon secret) and one of the devices attempts to access the target device, then the target device may perform one or more actions, such as, for example, creating a security log, notifying a person in authority (e.g., system administrator, manager/supervisor, teacher, parent, or the like), shutting down the target device for a period of time, another action, or any combination thereof. The security log may include a timestamp, the identities of proximate devices, an identity of the device that attempted to access the target device, the command (or other request) sent to the target device, other relevant information, or any combination thereof. The notification may take the form of an email, a text message, or other communication.

If a determination is made, at 504, that the conditions of the policy are satisfied, then the process proceeds to 508, where the M devices may be provided with access to the target device. For example, if the target device determines that each of the M devices have a certificate and a beacon secret, then the target device may grant each of the M devices access to the target device. If the target device determines that the conditions of the policy are not satisfied (or no longer satisfied), then the access to the target device may be denied or reduced. For example, if the target device detects that a particular device lacks a certificate, lacks a beacon secret, or lacks both, then the target device may determine that the conditions of the policy are not satisfied and deny or restrict access to the target device.

Figure 6:
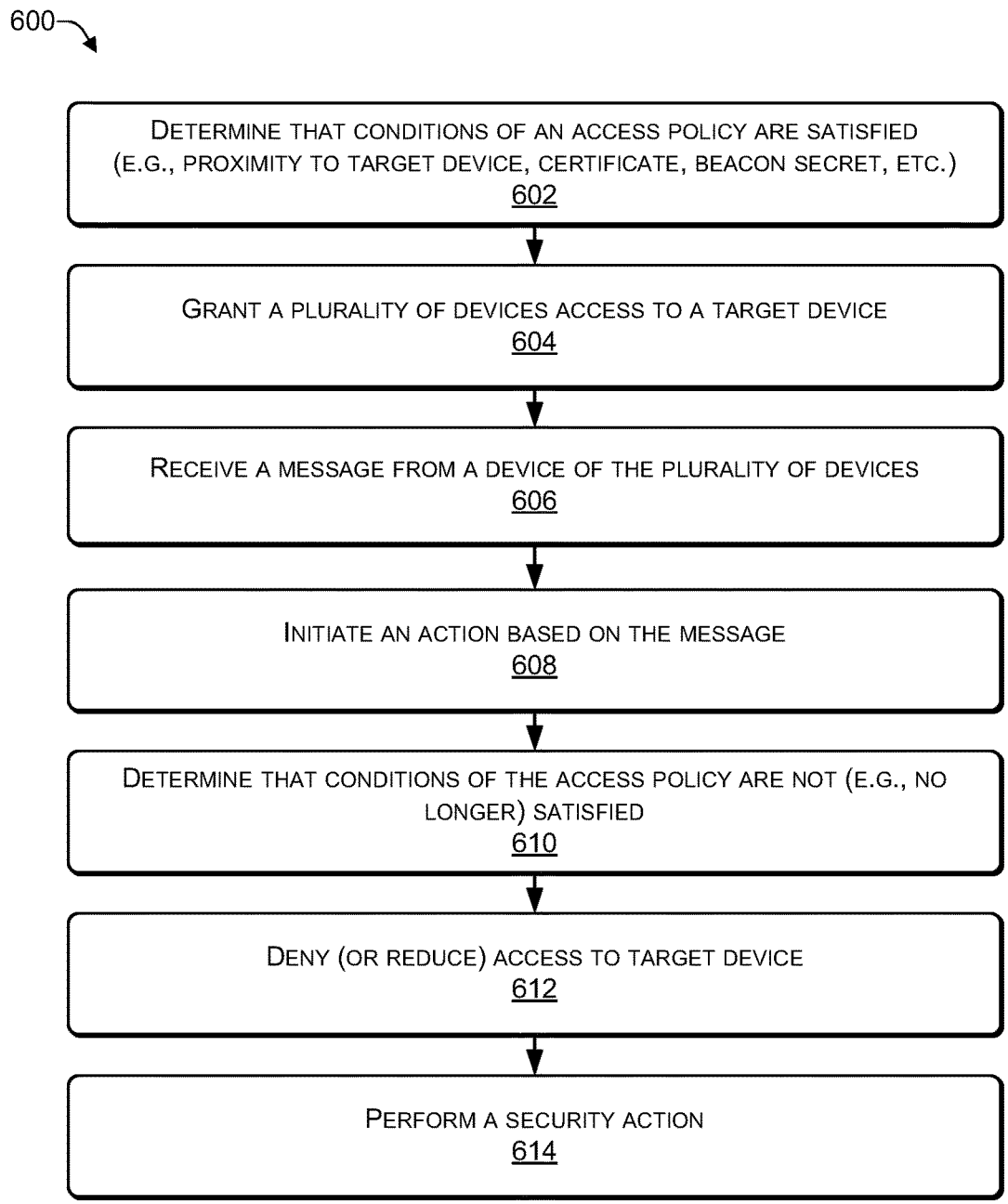
FIG. 6 is a flowchart of a process that includes granting a plurality of devices access to a target device according to some implementations.

FIG. 6 is a flowchart of a process 600 that includes granting a plurality of devices access to a target device according to some implementations. The process 600 may be performed by a device, such as one of the devices 102, 108 of FIG. 1.

At 602, a determination may be made that conditions of an access policy are satisfied. At 604, a plurality of devices may be granted access to a target device. For example, in FIG. 1, the target device 108 may determine whether conditions of the policy 128 are satisfied. To illustrate, the conditions may specify (i) a minimum distance (proximity) of at least a portion of the devices 102 to the target device 108, (ii) a maximum distance (proximity) of at least a portion of the devices 102 to the target device 108, (iii) a distance range (e.g., minimum distance and maximum distance) of at least a portion of the devices 102 to the target device 108, the certificate that the devices 102 were provisioned with, the beacon secret 122 of the devices 102, a privilege level (e.g., high, medium, low, teacher, supervisor/manager, parent, student, child, or the like) associated with each of the devices 102, another condition associated with one or more of the devices 102, 108, or any combination thereof. If the target device 108 determines that the conditions of the policy 128 are satisfied, then the target device may grant the portion of the devices 102 that satisfy the policy 128 with access to the target device 108.

At 606, a message may be received from a device of the plurality of devices. At 608, an action may be initiated based on (e.g., in response to receiving) the message. For example, in FIG. 1, one of the devices 102 may send the message 148 to the target device 108 and the target device 108 may initiate an action based on receiving the message. For example, a media playback player (the target device 108) may initiate playback of selected media content. As another example, a robotic arm (the target device 108) may initiate performing a set of commands. As yet another example, a database (the target device 108) may read data from the database, write data to the database, or delete data stored in the database.

At 610, a determination may be made that the conditions of the access policy are not (e.g., no longer) being satisfied. At 612, access to the target device may be denied (or reduced). At 614, a security action may be performed. For example, in FIG. 1, the target device 108 may repeatedly (e.g., every Q minutes, where Q>0) determine whether the conditions of the policy are still satisfied. If the target device 108 determines that the conditions of the policy are no longer satisfied, then the target device 108 may deny the devices 102 access to the target device 108 or reduce a level of access (e.g., reduced set of commands, slower execution of commands, or the like) to the target device 108. To illustrate, the conditions of the policy may no longer be satisfied if a device, such as the unauthorized device 142, does not have the certificate 120, does not have the secret 124, does not satisfy the proximity condition of the policy 128, or any combination thereof.

Figure 7:
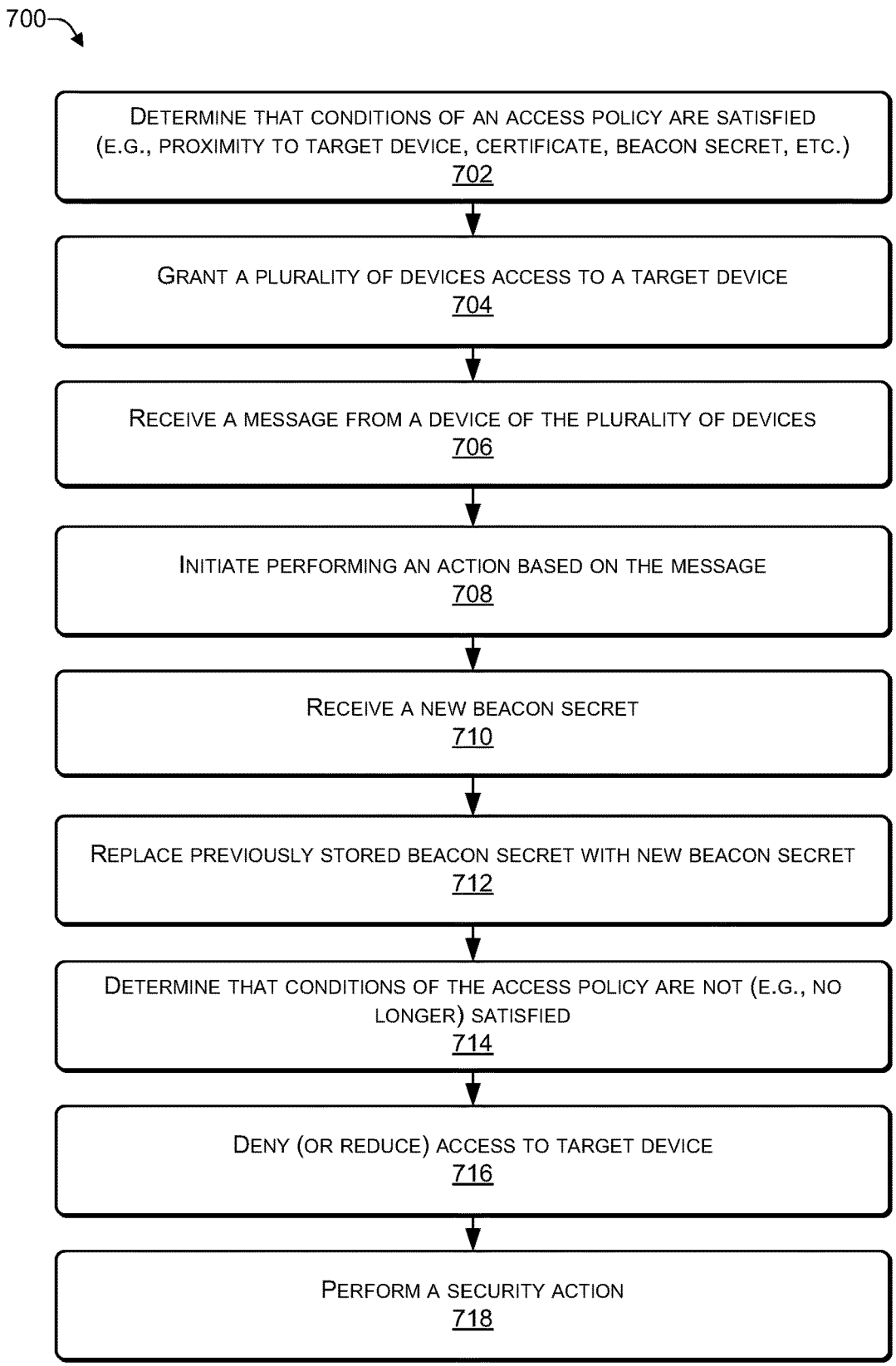
FIG. 7 is a flowchart of a process that includes receiving a beacon secret according to some implementations.

FIG. 7 is a flowchart of a process 700 that includes receiving a beacon secret according to some implementations. The process 700 may be performed by a device, such as one of the devices 102, 108 of FIG. 1.

At 702, a determination may be made that conditions of an access policy are satisfied. At 704, a plurality of devices may be granted access to a target device. For example, in FIG. 1, the target device 108 may determine whether conditions of the policy 128 are satisfied. To illustrate, the conditions may specify (i) a minimum distance (proximity) of at least a portion of the devices 102 to the target device 108, (ii) a maximum distance (proximity) of at least a portion of the devices 102 to the target device 108, (iii) a distance range (e.g., minimum distance and maximum distance) of at least a portion of the devices 102 to the target device 108, the certificate that the devices 102 were provisioned with, the beacon secret 122 of the devices 102, a privilege level (e.g., high, medium, low, teacher, supervisor/manager, parent, student, child, or the like) associated with each of the devices 102, another condition associated with one or more of the devices 102, 108, or any combination thereof. If the target device 108 determines that the conditions of the policy 128 are satisfied, then the target device may grant the portion of the devices 102 that satisfy the policy 128 with access to the target device 108.

At 706, a message may be received from a device of the plurality of devices. At 708, an action may be initiated based on (e.g., in response to receiving) the message. For example, in FIG. 1, one of the devices 102 may send the message 148 to the target device 108 and the target device 108 may initiate an action based on receiving the message. For example, a media playback player (the target device 108) may initiate playback of selected media content. As another example, a robotic arm (the target device 108) may initiate performing a set of commands. As yet another example, a database (the target device 108) may read data from the database, write data to the database, or delete data stored in the database.

At 710, a new beacon secret may be received. At 712, a previously stored beacon secret may be replaced by the new beacon secret. For example, in FIG. 1, the beacon 106 may periodically broadcast the new secret 138 to the devices 102, 108 based on the time interval 116. The devices 102 may replace the previously stored secret 124 with the new secret 138. The device 108 may replace the previously stored secret 134 with the new secret 138.

At 714, a determination may be made that the conditions of the access policy are not (e.g., no longer) being satisfied. At 716, access to the target device may be denied (or reduced). At 718, a security action may be performed. For example, in FIG. 1, the target device 108 may repeatedly (e.g., every Q minutes, where Q>0) determine whether the conditions of the policy are still satisfied. If the target device 108 determines that the conditions of the policy are no longer satisfied, then the target device 108 may deny the devices 102 access to the target device 108 or reduce a level of access (e.g., reduced set of commands, slower execution of commands, or the like) to the target device 108. To illustrate, the conditions of the policy may no longer be satisfied if a device, such as the unauthorized device 142, does not have the certificate 120, does not have the secret 124, does not satisfy the proximity condition of the policy 128, does not have the new secret 138, or any combination thereof.

Figure 8:
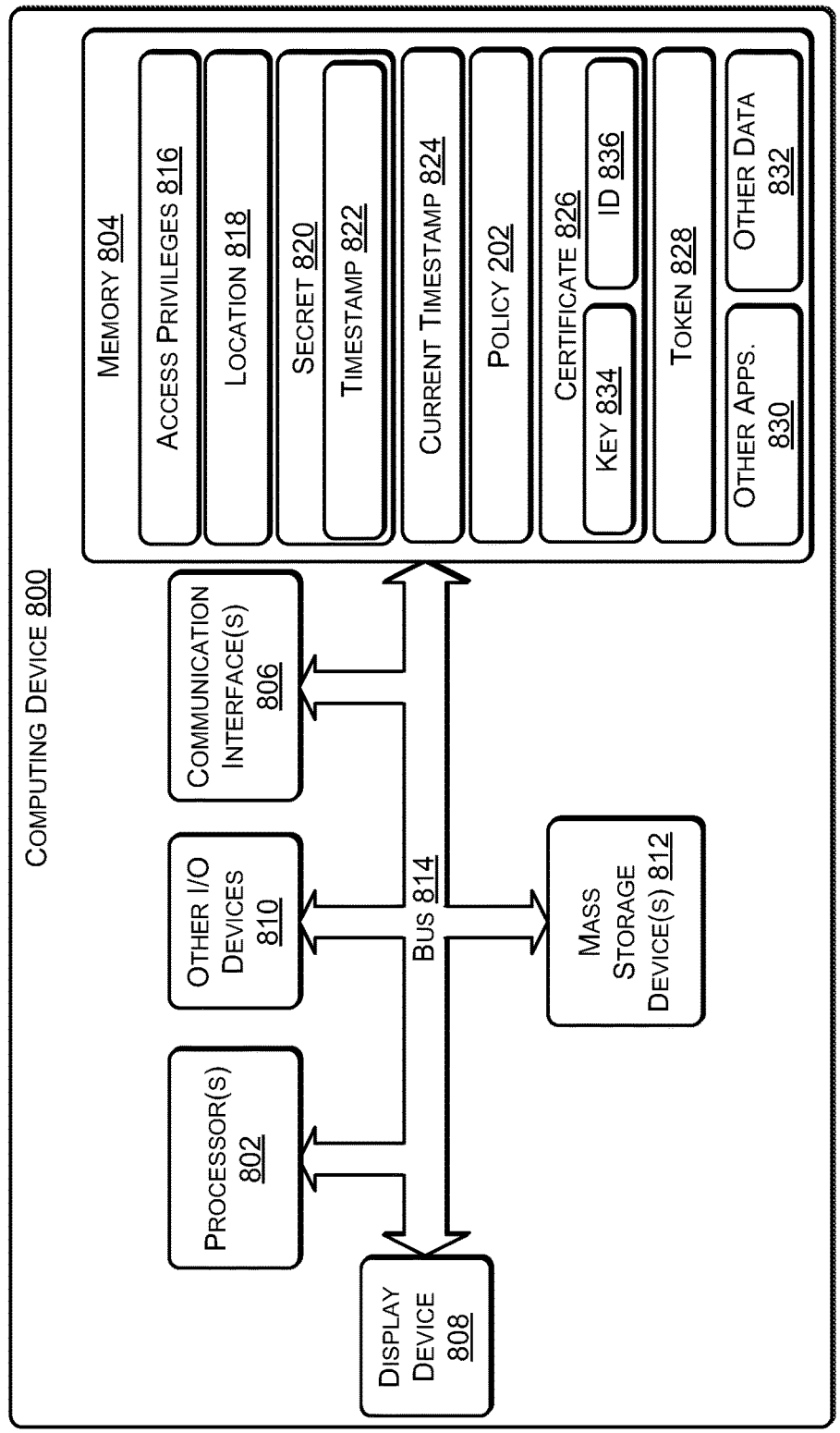
FIG. 8 illustrates an example configuration of a computing device that can be used to implement the systems and techniques described herein.

FIG. 8 illustrates an example configuration of a computing device 800 that can be used to implement the systems and techniques described herein, such as, for example, one or more of the devices 102, the server 104, the beacon 106, the target device 108, or the like. The computing device 800 may include one or more processors 802, the memory 804, communication interfaces 806, a display device 808, other input/output (I/O) devices 810 (e.g., keyboard, trackball, and the like), and one or more mass storage devices 812, configured to communicate with each other, such as via one or more system buses 814 or other suitable connections. While a single system bus is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are hardware devices (e.g., integrated circuits) that may include a single processing unit or a number of processing units, all of which may include single or multiple computing units or multiple cores. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be any type of non-transitory storage media capable of storing computer-readable, processor-executable program instructions as computer program code that can be executed by the processors 802 as a particular machine configured for carrying out the operations and functions described in the implementations herein.

The computing device 800 may also include one or more communication interfaces 806 for exchanging data via a network. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

Other I/O devices 810 may be devices that receive various inputs from a user and provide various outputs to the user, and may include a keyboard, a touchpad, a mouse, a printer, audio input/output devices, and so forth. The other I/O devices 810 may include various types of sensors, at least some of which may be used to determine a distance (e.g., proximity) between the devices 102 and the target device 108 of FIG. 1. For example, the other I/O devices may include one or more of a magnetometer, a global satellite positioning (GPS) sensors, inertial sensors inertial sensors (e.g., a compass or magnetometer to determine direction, an accelerometer to report how fast the computing device is moving in the direction, and a gyroscope to sense turning motions), a barometer, radio-frequency identification (RFID), near-field communication (NFC), or the like.

The computer storage media, such as memory 804 and mass storage devices 812, may be used to store software and data. For example, the computer storage media may be used to store access privileges 816, a location determination module 818, a secret 820 with a timestamp 822, a current timestamp 824, a policy 202, a certificate 826, token 828, other applications 830, and other data 832. The access privileges 816 may be configured according to the environment in which the computing device 800 is to be used. For example, three levels, such as high, medium, and low, may be defined, with low providing basic or minimal access, medium providing additional access, and high providing minimally restricted (or unrestricted) access. In a school environment, the access levels may include teacher and student or teacher, senior student, and junior student. In a work environment, the access levels may include manager, supervisor, and employee. In a home environment, the access levels may include parent, teenager, and adolescent.

The location determination module 818 may be capable of determining a location of the computing device 800 and providing the location to another device (e.g., the one of the computing devices 102 may provide their location to the target device 108). The location determination module 818 may be capable of determining a location of another device, e.g., by requesting the location from the other device, requesting the location from a server (e.g., the server 104 of FIG. 1), or the like. For example, the server 104 or the beacon 106 of FIG. 1 may determine the location using a geolocation technique, (e.g., each device receiving the secret 138 may determine a signal strength of the beacon 106 and indicate the signal strength in the acknowledgement message), triangulation of a wireless signal (e.g., Wi-Fi® signal, cellular signal, Bluetooth® signal, or the like), or another geolocation technique.

The certificate 826 may be used to identify the computing device 800 on a network. The certificate 826 may include a public key 834 and an identity (ID) 836 of an owner of the certificate. The certificate may be issued by a certification authority (e.g., the server 104) that validates the identity of the certificate-holder both before the certificate is issued and each time the certificate is used. The certificate 826 may be used for (i) encryption, (ii) signature, (iii) signature and encryption, or any combination thereof. When the certificate 826 is used for encryption, the certificate 826 may include cryptographic keys for encryption and decryption. When the certificate 826 is used for signature, the certificate 826 may include cryptographic keys for signing data. When the certificate 826 is used for signature and encryption, the certificate 826 may include a cryptographic key that may be used to (1) encrypt data, (2) decrypt data, (3) logon, or (4) digitally sign data. The 826 may be used as a secure delivery mechanism for the secret 820. For example, the certificate 826 may be used to exchange a public/private key pair along with a message digest and signature. The certificate 826 may be used to authorize or authenticate data that is being exchanged with other devices.

The timestamp 822 associated with the secret 820 may indicate when the secret 820 was created (or a time after which the secret 820 will be invalid). For example, when the computing device 800 receives a secret from another device, the computing device 800 may compare a timestamp of the received secret with the current timestamp to determine whether the received secret is still valid. If a difference between a timestamp of a received secret and the current timestamp 824 is greater than the time interval 116 of FIG. 1 at which the new secret 138 is broadcast, then the received secret may be invalid (e.g., expired).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by one or more processors of a target device, that each device of a plurality of devices includes a certificate that is provided to each device during provisioning;
   determining, by the one or more processors, that each device of the plurality of devices is within a predetermined distance from the target device;
   determining, by the one or more processors, that each device of the plurality of devices includes a beacon secret that is broadcast to each device at a predetermined time interval; and
   determining, by the one or more processors, that either:
      a privilege level associated with at least one device of the plurality of devices satisfies a particular privilege level specified by an access policy; or
      a number of the plurality of devices within the predetermined distance from the target device satisfies a predetermined number specified by the access policy;
   granting, by the one or more processors, at least one device of the plurality of devices access to the target device;
   receiving, by the one or more processors, a message from the at least one device of the plurality of devices; and
   initiating, by the target device, an action based at least in part on the message.

2. The method of claim 1, wherein determining that each device of the plurality of devices includes the certificate comprises:
   performing a certificate-based handshake between the target device and each device of the plurality of devices.

3. The method of claim 1, further comprising:
   receiving a new beacon secret; and
   based at least in part on determining that at least one device did not receive the new beacon secret:
      denying the at least one device of the plurality of devices access to the target device; or
      reducing a level of access of the at least one device to the target device.

4. The method of claim 1, wherein the predetermined distance comprises at least one of:
   a minimum distance between each device and the target device; or
   a maximum distance between each device and the target device.

5. The method of claim 1, wherein each device of the plurality of devices performs a certificate-based handshake with other devices of the plurality of devices.

6. The method of claim 1, further comprising:
   determining that an unauthorized device does not satisfy at least a particular condition specified by the access policy; and
   creating a security notification associated with the unauthorized device.

7. The method of claim 1, wherein the target device comprises one of:
   a streaming media player; or
   a remote-controlled robotic device.

8. A target device comprising:
   one or more processors; and
   one or more non-transitory computer-readable storage media to store instructions executable by the one or more processors to perform operations comprising:
      determining that each device of a plurality of devices includes a certificate that is provided to each device during provisioning;
      determining that each device of the plurality of devices is within a predetermined distance from the target device;
      determining that each device of the plurality of devices includes a beacon secret that is broadcast to each device at a predetermined time interval; and
      determining that either:
         a privilege level associated with at least one device of the plurality of devices satisfies a particular privilege level specified by an access policy; or
         a number of the plurality of devices within the predetermined distance from the target device satisfies a predetermined number specified by the access policy;
      granting, by the one or more processors, at least one device of the plurality of devices access to the target device;
      receiving, by the one or more processors, a message from the at least one device of the plurality of devices; and initiating, by the target device, an action based at least in part on the message.

9. The target device of claim 8, wherein determining that each device of the plurality of devices include the certificate comprises:
performing a certificate-based handshake between each device of the plurality of devices and the target device.

10. The target device of claim 8, the operations further comprising:
receiving a new beacon secret; and
based at least in part on determining that at least one device did not receive the new beacon secret:
denying the at least one device of the plurality of devices access to the target device; or
reducing a level of access of the at least one device to the target device.

11. The target device of claim 8, wherein the predetermined distance comprises at least one of:
a minimum distance between each device and the target device; or
a maximum distance between each device and the target device.

12. The target device of claim 8, wherein each device of the plurality of devices performs a certificate-based handshake with other devices of the plurality of devices before being granted access to the target device.

13. The target device of claim 8, the operations further comprising:
determining that an unauthorized device does not satisfy at least a particular condition of the access policy; and
creating a security notification associated with the unauthorized device.

14. The target device of claim 8, wherein the target device comprises one of:
a streaming media player; or
a remote-controlled robotic device.

15. One or more non-transitory computer-readable storage media to store instructions executable by one or more processors of a target device to perform operations comprising:
determining that each device of a plurality of devices includes a certificate that is provided to each device during provisioning;
determining that each device of the plurality of devices is within a predetermined distance from the target device;
determining that each device of the plurality of devices includes a beacon secret that is broadcast to each device at a predetermined time interval; and
determining that either:
a privilege level associated with at least one device of the plurality of devices satisfies a particular privilege level specified by an access policy; or
a number of the plurality of devices within the predetermined distance from the target device satisfies a predetermined number specified by the access policy;
granting, by the one or more processors, at least one device of the plurality of devices access to the target device;
receiving, by the one or more processors, a message from the at least one device of the plurality of devices; and
initiating, by the target device, an action based at least in part on the message.

16. The one or more non-transitory computer-readable storage media of claim 15, further comprising:
receiving a new beacon secret broadcast by a beacon at a predetermined time interval; and
replacing a beacon secret stored in the one or more non-transitory computer-readable storage media with the new beacon secret.

17. The one or more non-transitory computer-readable storage media of claim 15, the operations further comprising:
receiving a new beacon secret; and
based at least in part on determining that at least one device did not receive the new beacon secret:
denying the at least one device of the plurality of devices access to the target device; or
reducing a level of access of the at least one device to the target device.

18. The one or more non-transitory computer-readable storage media of claim 15, wherein the predetermined distance comprises at least one of:
a minimum distance between each device and the target device; or
a maximum distance between each device and the target device.

19. The one or more non-transitory computer-readable storage media of claim 15, wherein determining that each device of the plurality of devices includes the certificate comprises:
performing a certificate-based handshake between the target device and each device of the plurality of devices.

20. The one or more non-transitory computer-readable storage media of claim 15, further comprising:
determining that an unauthorized device does not satisfy at least a particular condition of the access policy; and
sending a security notification indicating a presence of the unauthorized device.

* * * * *